(12) United States Patent
Westerman et al.

(10) Patent No.: US 6,837,420 B2
(45) Date of Patent: Jan. 4, 2005

(54) FOLDABLE PORTABLE COOLER WITH ENHANCED OVER-CENTER LOCKING HANDLE

(75) Inventors: Frank E. Westerman, Little Rock, AR (US); Frank G. Westerman, Maumelle, AR (US)

(73) Assignee: Wes Pak, Inc., Little Rock, AR (US)

( * ) Notice: Subject to any disclaimer, the term of this patent is extended or adjusted under 35 U.S.C. 154(b) by 0 days.

(21) Appl. No.: 10/642,536

(22) Filed: Aug. 18, 2003

(65) Prior Publication Data

US 2004/0031842 A1 Feb. 19, 2004

Related U.S. Application Data

(63) Continuation-in-part of application No. 10/295,171, filed on Nov. 15, 2002, now Pat. No. 6,736,309.
(60) Provisional application No. 60/333,208, filed on Nov. 16, 2001.

(51) Int. Cl.[7] ............................. B65D 5/468; B65D 5/36
(52) U.S. Cl. ............................. 229/117.15; 229/117.05; 229/186
(58) Field of Search ...................... 229/117.05, 117.14, 229/117.15, 148, 149, 186

(56) References Cited

U.S. PATENT DOCUMENTS

| | | | | |
|---|---|---|---|---|
| 2,007,810 A | * | 7/1935 | Oman | 229/117.15 |
| 2,269,013 A | * | 1/1942 | Dorfman | 229/117.15 |
| 2,714,982 A | * | 8/1955 | Strauss | 229/117.15 |
| 2,805,813 A | * | 9/1957 | Rittmueller | 229/117.15 |
| 3,193,176 A | * | 7/1965 | Gullickson | 229/117.06 |
| 3,194,480 A | * | 7/1965 | Maindron | 229/117.15 |
| 3,780,934 A | * | 12/1973 | Gardner | 229/117.15 |
| 4,119,265 A | | 10/1978 | Dlugopolski | |
| 4,238,069 A | * | 12/1980 | Morris, Jr. | 229/117.15 |
| 4,403,728 A | * | 9/1983 | Koltz | 229/117.15 |
| 4,784,497 A | | 11/1988 | Dutton | |
| 5,020,337 A | | 6/1991 | Krieg | |
| 5,042,715 A | * | 8/1991 | McNeill | 229/117.15 |
| 5,062,527 A | | 11/1991 | Westerman | |
| 5,074,460 A | * | 12/1991 | Hanekamp | 229/117.05 |
| 5,094,359 A | | 3/1992 | DeMars | |
| 5,263,339 A | * | 11/1993 | Evans | 229/117.15 |
| 5,284,294 A | | 2/1994 | Floyd | |
| 5,303,863 A | | 4/1994 | Arasim | |
| 5,307,986 A | | 5/1994 | Schuster | |
| 5,392,984 A | * | 2/1995 | Yocum | 229/117.15 |
| 5,562,228 A | | 10/1996 | Ericson | |
| 5,853,121 A | * | 12/1998 | Francisco | 229/117.14 |
| 6,253,993 B1 | * | 7/2001 | Lloyd et al. | 229/117.15 |
| 6,736,309 B1 | * | 5/2004 | Westerman et al. | 229/117.05 |

* cited by examiner

*Primary Examiner*—Gary E. Elkins
(74) *Attorney, Agent, or Firm*—Stephen D. Carver (57) ABSTRACT

A rugged, hand-held container for storing beverage containers is formed by folding together multiple panels defined in a pre-scored, slot-less blank. Each blank comprises a rectangular center panel integrally bordered by a pair of end panels and side panels. Integral, diametrically spaced apart corner panels interconnect the center panel with the other panels. Score lines between the adjacent panels facilitate folding. The center panel forms a cooler bottom, and blank end and side panels respectively form carton ends and sides. Each end panel has an outer locking panel comprising an elongated receptive slot. Each side panel has an integral outer handle panel comprising an inner roof segment that forms the container top and handle segments with locking tabs that are captivated within the receptive slot. A radiused locking tab ramp comprises an enlarged portion providing an overcenter action. Notches adjacent the tabs captivate the locking panels.

20 Claims, 12 Drawing Sheets

FOLDABLE PORTABLE COOLER WITH ENHANCED OVER-CENTER LOCKING HANDLE

CROSS REFERENCE TO RELATED APPLICATION

This application is a Continuation-in-Part of our prior pending U.S. patent application Ser. No. 10/295,171, Filed Nov. 15, 2002, and entitled "Quick Erecting Foldable Portable Cooler," now U.S. Pat. No. 6,736,309 which was in turn based upon prior Provisional Patent Application, Ser. No. 60/333,208, Filed: Nov. 16, 2001, that was also entitled "Quick Erecting Foldable Portable Cooler."

BACKGROUND OF THE INVENTION

I. Field of the Invention

This invention relates generally to portable, foldable corrugated or cardboard containers. More particularly, our invention relates to corrugated boxes that fold from a flat shipping state to a durable, deployed state for storing beverage containers with ice, including rugged deployable handles that enable hand-carrying of the container at the same time. Known prior art that is germane to the invention because of handle construction is classified in U.S. Class 229, Subclasses 179, and 117.13 and 117.14.

II. Description of the Prior Art

Numerous portable, box-like containers have previously been proposed for temporarily storing and thermally-isolating foods or beverages. Containers comprising portable, disposable "coolers" are typically folded together from flat blanks, and then constrained by glue or staples, or other, separately-installed mechanical fasteners. Suitable blanks, as well recognized in the art, are usually made of paperboard, cardboard, or corrugated material. Typical "coolers" are subject to significant stresses, resulting from their internal load, and the rough and haphazard handling to which they are subjected during normal use. It is well recognized in the art that such containers will be treated carelessly and indifferently by their owners. Coolers will inevitably be subjected to physical abuse, from vibration, pounding, and dropping. Since modern coolers constrain a hefty quantity of ice cubes and a six-pack or two of a desired beverage, design considerations relating to weight, strength and endurance are commercially important.

Typical disposable cartons or "coolers" are variously sized to accommodate a substantial load of ice cubes together with several beverage containers. When a large volume of ice is combined with numerous twelve to sixteen ounce bottles or cans, a relatively heavy weight results. Because of this relatively heavy weight load, typical containers may be inconvenient to transport without adequate handle structures. However, the handles must be rugged and durable, as such containers will be routinely subjected to rough, and casual treatment.

Aggravating the necessity for rugged design is the fact that the ice held by the container will of course melt eventually, and as water is absorbed into the corrugated or paperboard structure, those designs that have not been adequately waterproofed will soon collapse. Of course it is desirable that suitable coolers temporarily contain the meltdown, so that leaking water does not escape the cooler and damage the users vehicle, clothing, or possessions. Of course, the previously discussed misuse to which such containers are routinely subjected further aggravates commercial design imperatives.

Because of the strain of the heavy load often borne by these increasingly popular corrugated containers, the handle structure may be the first piece to fail. Often the handle structures are added to the assembled blank after appropriate folding. Many handle designs exist, and a variety of interconnection schemes are known. For example, in our copending utility patent application, entitled Quick Erecting Foldable Portable Cooler, Ser. No. 10/295,171, filed Nov. 15, 2002, the handle is a separate part, comprising a pair of spaced-apart ends, each of which is equipped with integral feet that anchor beneath receptive holes formed in the cooler.

In addition to the foregoing considerations, the commercial success and/or market practicability of the candidate corrugated coolers is inexorably linked to common market factors like the cost of production, the cost of shipment, and the ease of use. Where as here the product is represented as being "disposable," a low cost is obviously a root consideration. Although the strongest available corrugated coolers are routinely assembled by the beverage vendor, rather than the retail beverage consumer, it is imperative for cost minimization that the candidate cooler be shippable in a flat, unassembled form. Further, a proper design must abrogate the typical requirement of mechanical staples or other fasteners. Finally, the assembled container must be durable and waterproof, at least for a significant portion of its intended or expected useful life, which can vary between three to five hours when subjected to conditions of hard use. Ideally the handle structure should not involve separate parts that necessitate end-user assembly. It is desirable in some cases for the handle structure to be inherent in the blank's construction; in other words, a commercially ideal, ruggedized cooler design should include integral handles formed by cooperating blank panels or segments. The design must be resistant to water and other liquids, and it should withstand appreciable misuse while heavily loaded for substantial time periods.

U.S. Pat. No. 5,284,294 discloses a disposable container made from an integral blank of corrugated cardboard that folds between flat, storage orientations and an erected or deployed configuration. The container is adapted to store beverages or other articles, in an appealing, iced down condition. A bottom wall is foldably attached to two pairs of side walls that are joined by pleated walls, forming a "seamless" interior when assembled. The latter feature is important for leak-proofing. The container walls are self-locking without external staples or fasteners. A moisture-proof coating formed on the box interior further minimizes potential leakage. One of the top walls has a panel with lateral locking tabs that fold down during cooler assembly and are mated to receptive slots formed by the upright walls. The carrying handle is formed from abutting cutouts.

Prior U.S. Pat. No. 5,062,527, which issued Nov. 5, 1991, and which was invented by one of the inventors common to this case, disclosed a "Foldable, leakproof multi-mode Carton Construction" and a blank that is similar to the instant invention's blank. The slotless and leakproof cooler disclosed therein is ideal for storing and transporting regulated medical waste. The corrugated, cooler blank can be quickly folded to form the cooler. Preferably, a separate plastic liner is provided to waterproof the cardboard or corrugated material interiorly. Each blank comprises a center panel, a pair of bordering side panels, a pair of bordering end panels, and four corner panels. The scoring lines comprise a first pair of spaced apart, parallel fold lines extending longitudinally, and a second pair of parallel fold lines crossing the width of the blank. Diagonal fold lines are scored into the corner panels. The center panel forms a bottom of the cooler, and the width and length panels respectively form cooler ends and sides. The corner panels foldably divide into separate segments which abut each other and overly the length panels. A knock down system that permits erected coolers to be flattened, includes a knock down line which evenly bisects the blank and a cooperating pair of groups of generally triangular relief lines formed in the center panel. The assembled cooler may be flattened by urging the length panels together, whereupon the width panels will fold into the carton interior. A similar deforming movement facilitated by the triangular relief lines enables the center panel to collapse outwardly from the carton.

U.S. Pat. No. 5,094,359 discloses an ice cooler adapted to be disposed in a minimum volume disposition for shipping, which is thereafter expanded upon erection. Cooler end and side panels comprise foldable flaps that close the container. The foldable flaps are uncoupled to expose the container interior and facilitate and increase in resultant size to allow the introduction of beverage containers and a quantity of ice.

U.S. Pat. No. 5,020,337 issued Jun. 4, 1991, and entitled "Combination ice package and Expandable Cooler" comprises a box-like cooler comprising an extendable upper portion consisting of folded cardboard flaps. Expanding top flaps fold to form a top seal through the use of mating notches which frictionally engage one another. The upper portion of the structure is provided with circular access areas through which drinks may be inserted while being consumed.

U.S. Pat. No. 5,562,228 discloses a collapsible cooler comprising a floor surrounded by a plurality of foldable walls interconnected by a hinge. Internal container subassemblies include quantities of a heat transfer material. Peripheral hinges connect the floor module and the lower wall subassemblies for securing the lower wall subassemblies to the floor assembly. Flexible corner panels are connected between adjacent, foldable wall assemblies. A carry strap assembly which includes a first end is connected to one upper wall subassembly, and a second end of the carry strap assembly is connected to an opposite upper wall subassembly. A lid assembly with a handle is adapted to fit onto upper edges of the respective upper wall subassemblies.

U.S. Pat. No. 5,303,863 issued Apr. 19, 1994, discloses a corrugated container having a compartment for multiple beverage containers, and means for holding ice. The comprising a plurality of panels arranged in stacked relationship when deployed. The panels are unfolded to form an ice bin atop the compartment. Bottles or cans are cooled by direct contact with the ice stored within the bin. By first withdrawing plural cans from the compartment, pouring in ice, and then nestling the withdrawn cans back into the bin ice, most cans in directly contact the ice.

U.S. Pat. No. 4,119,265 issued Oct. 10, 1978, and entitled "Seamless leakproof container" discloses a cooler made from a single, generally rectangular corrugated blank. A pair of triangular corner panels first folded together into face-to-face contact are folded over the ends of a box as the four sides of the rectangular blank are raised to form the side and end panels of a five-sided box. A cover panel is integrally joined to one edge of a side panel, to swing down and close the box.

U.S. Pat. No. 5,307,986, entitled "Expandable watertight article carrier" discloses a cooler comprising top and side panels interconnected by gusset panels. When the gusset panels are relaxed, the side and end panels are released to pivot about their foldable connection to the bottom panel to expand the interior of the carrier while maintaining the carrier in watertight condition.

U.S. Pat. No. 4,784,497 issued Nov. 15, 1988 teaches a flat, paperboard blank that can be conveniently carried and readily assembled into a rectangular carton for disposal of small litter such as cups, cans, and tissues.

Through experimentation with numerous handle designs, in conjunction with portable foldable coolers of the type generally described above, we have invented a disposable and portable cooler with integral handles that adequately support relatively large loads, while at the same time locking the unit into a desired stable condition.

SUMMARY OF THE INVENTION

Our invention provides a rugged, hand-held cooler that dependably stores beverage containers and generous quantities of ice. Our cooler is deployed quickly and efficiently by folding a pre-scored, corrugated blank. A vertically upright handle is formed from abutting panels that are integrally locked together by angled locking panels when assembled. When the cooler panels are folded together through the construction disclosed, the container is pre-stressed and thus strengthened in response to weight borne and distributed angularly by the handle.

Additionally our ice cooler quickly deploys from a flat "minimal volume" storage position in which numerous blanks may be stored atop one another in layers. The inherently "slotless" blank co-features a "knock-down" bottom, enabling quantities of partially-erected boxes to be shipped with minimal volume. After proper deployment, the resultant cooler has no proactive leak paths, so that it does not spill or leak water from melting ice.

The rectangular blank that is die-cut from corrugated sheet stock is preferably waterproofed with a thin polyethylene coating. Each blank comprises a generally rectangular center panel integrally bordered by a pair of integral end panels and a pair of integral side panels. Four integral, diametrically spaced apart corner panels interconnect the center panel with the end and side panels. Score lines proximately defined between the adjacent panels facilitate subsequent folding.

The center panel forms a cooler bottom, and the cooler end and side panels respectively form carton ends and sides when deployed. When various panels are folded vertically upwardly, the corner panels will bend across the diagonal fold lines, forming twin, generally triangular abutting segments that make surface-to-surface contact. These segments are foldably tucked away into the cooler interior after box erection, and they are retained by properly folding the end panel flaps downwardly into the cooler interior. Thus, our cooler has no slots or inherent leak paths.

Each end panel has an outer locking panel integrally formed at its outer edge and shaped generally like an hourglass. The locking panels comprise a pair of mirror images, or trapezoidal halves adapted to be folded together. Each side panel has an integral, outer handle panel that, after folding, forms a carrying handle. Each handle panel comprises an inner roof segment that forms half of the cooler top, and which is separated from the adjoining handle segment by a fold line. In assembly, the handle panels are frictionally mated to the locking panels. In the best mode, the resulting handle is disposed vertically, with the locking panels captivated by the handle panels at an angle of approximately forty-five degrees. The handle portion includes an elongated hand hole, thereby enabling carrying.

A pair of upper and outer, spaced apart locking tabs extend from the outermost corners of the handle portions to inclined, angularly disposed locking notches. An adjacent, specially shaped ramp formed on the tabs mates within suitably configured, receptive slots formed in the locking panels. Each locking panel is a two-ply arrangement of added strength. Aligned slots in the abutting locking panel halves are penetrated by the handle panel locking tab during folding. As the tab is inserted, gradually increasing resistance is experienced upon initial engagement as a result of the increasing radius of the tab contour. As forcible folding of the locking portions against the handle portion tabs concludes, the receptive locking slot forcibly admits the locking tab. However, resistance decreases as folding ends and assembly is completed, because the ramp (i.e., on the handle portion locking tab) slides over the uppermost edge within the receptive slots in the locking panel. Then, locking occurs within an adjacent captivation notch within the handle segment. Because of the configuration of the locking tab ramp, an "over center" action is achieved by frictional contact within the receptive slot, and the locking panel is hooked by and held within the captivation notch.

The described locking arrangement is strengthened by the inability of the locking panels to escape the locking tabs, once registered within the captivation notches. Further, the angular and two-ply construction of the locking panel distributes weight through vector resolution, enhancing cooler strength and durability. Use of a packed cooler subjects the handle to appreciable weight, which pre-stresses the structure to maintain its shape.

Thus, a broad object of our invention is to provide a highly reliable and durable handle-equipped cooler for containing generous amounts of ice and beverages.

Another broad object of our invention is to provide a cooler of the character described with a rugged, integral handle structure that is integrally formed from portions of the blank without separate parts.

Another basic object is to provide an inexpensive blank which easily folds into a durable cooler with an integral handle of the character described.

Another important object is to provide an improved cooler made from a slotless, corrugated blank that may be readily transformed between a relatively flat storage configuration, and a secure, box-like cooler configuration with an integral handle.

Yet another object is to provide such an improved, disposable cooler that is lightweight and strong, and yet which is resistant to water leaks.

A related object is to provide a disposable ice cooler of the character described that occupies a minimal shipping volume.

A still further object is to provide a cooler including an integral handle that may be formed simply by folding a corrugated blank, but which may be easily flattened into a transportable or storage position.

Another fundamental object of our invention is to provide an easily carried and inexpensive cooler that will store ice and a plurality of bottles or cans without leakage or that will collapse for a relatively long period of time.

A further basic object is to provide a cooler of the character described that will function reliably even when abused.

Another important object is to provide a reliable beverage ice cooler that replaces conventional, environmentally-unfriendly styrofoam coolers.

Yet another object is to provide a rugged, foldable cooler which, when lifted up by its handle, strengthens rather than weakens.

An additional object of our invention is to provide a cooler of the character described which may be readily assembled from a single, integral, pre-scored blank.

Yet another object is to provide a foldable cooler which is effective for storing warm or cold products for moderate periods of time.

Another important object is to provide a cooler design of the character described, and a blank for such a cooler, which may be selectively deployed in flat and/or fully or partially set-up orientations, without separate handle components.

Yet another object is to provide a disposable cooler which is easily folded between flat storage positions and deployed, thereby having generally cubical configurations.

In other words, an important object of our new cooler is to minimize complexity and set-up difficulty.

Yet another object of our construction is to make an improved disposable cooler whose inherent handle locking feature provides a strong and secure connection between foldable parts.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE PREFERRED EMBODIMENT

With reference now directed to the appended drawings (FIGS. 2–12), our improved cooler has been generally designated by the reference numeral 20. Our cooler 20 comprises a box-like, generally cubicle cooler formed by appropriately folding a generally planar blank 24 (FIG. 1), as hereinafter described. As will be appreciated by those skilled in the art, the size and dimensions of blank 24 may be varied as desired to construct coolers or containers of different volumes, geometrical configurations, and sizes. Cooler 20 is primarily intended to hold ice and miscellaneous beverage containers; a variety of other items can be stored as well. To form cooler 20, blank 24 is transformed into the cooler 20 as folding progresses according to the preferred erection sequence illustrated in FIGS. 2–9. When folded as previously mentioned, blank 24 forms so that no leak paths and a substantially waterproof arrangement results. After erection, the cooler may be flattened for storage or shipping as hereinafter described. Importantly, an integral, upright handle 25 (i.e., FIGS. 6, 7, 9) is disposed at the upper center of the cooler 20, and its angular construction pre-stresses the cooler structure for enhanced durability and overall strength.

Figure 1:
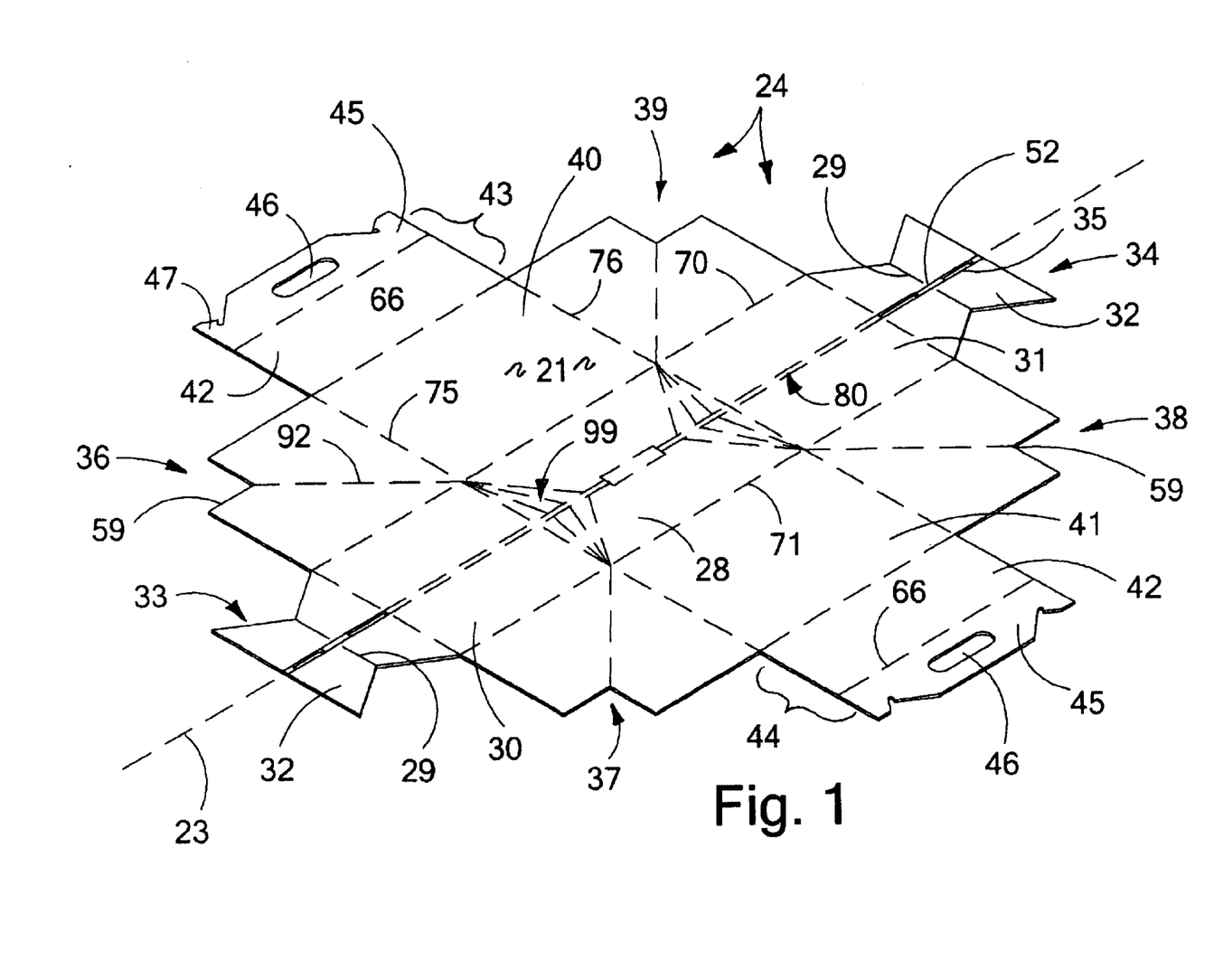
FIG. 1 is a perspective view of the corrugated, pre-scored blank that can be folded, as hereinafter described, to form a cooler equipped with locking handles.

Blank 24 (FIG. 1) is preferably formed from a die-cut piece of corrugated sheet material. Blank 24 can be produced through a variety of techniques known in the art, and it can be made from waterproof paperboard, fiber or plastic sheet materials, or different forms and types of commercial-grade cardboard or heavy weight paper. Preferably, the blank surface 21 facing the viewer in FIG. 1 is coated with polyethylene plastic for moisture resistance. As revealed in FIG. 1, blank 24 is preferably rectangular, having a length somewhat greater than its width. The longitudinal center axis is generally coincident with the central score lines, and has been generally designated by the reference numeral 23. The blank's length runs generally from the left to the right as viewed in FIG. 1. Blank 24 has been appropriately scored by numerous intersecting score lines that divide the blank into a plurality of separate but integral panels. When blank 24 is folded to form the cooler 20, the preferred steps involved are partially illustrated in sequential form in consecutive FIGS. 2–9, and each of the individual component panels seen in FIG. 1 will form various body portions of the deployed cooler 20.

For purposes of clarity, it should be appreciated that the upper or top surface projecting towards the viewer in FIG. 1 becomes the interior surface of the cooler 20 after folding. Of course the various panels and portions of panels exposed in FIG. 1 have a corresponding undersurface not seen until folding occurs. The undersurface of each numbered panel identified by a given reference numeral in FIG. 1 will be hereinafter designated in succeeding drawing Figures by the same reference numeral with the suffix "A" appended to it.

The preferred blank 24 (FIG. 1) comprises a generally rectangular center panel 28 that has integral end panels 30, 31 bordering its ends. When the cooler is assembled, center panel 28 will form the bottom of the container, and end panels 30 and 31 will form container ends. Outer locking panels 33, 34 are respectively integral with end panels 30, 31. In their preassembly unfolded orientation, the locking panels 33, 34 (FIG. 1) have a generally hourglass shape. Upon subsequent folding, the locking panels assume a two-ply, generally trapezoidal configuration (i.e., FIG. 8) as hereinafter described. Each locking panel 33, 34 comprises adjoining, mirror image trapezoidal halves 32, which are separated from one another by a fold line 29 (FIG. 1). Elongated, receptive slots 35 are defined in each locking panel half 32, and these slots are aligned in assembly when halves 32 are folded together to form the composite locking panel. Blank 24 further comprises four, integral, corner panels 36, 37, 38 and 39, and integral side panels 40, 41 bordering its sides. When the cooler is assembled, side panels 40, 41 will form the sides of the container, and the corner panels will be tucked away into the interior. The diametrically spaced-apart corner panels 36–39 interconnect the center panel 28 with the end panels 30 and 31 and with the side panels 40, 41. Side panels 40, 41 preferably comprise integral, handle panels 43, 44 respectively.

Figure 8:
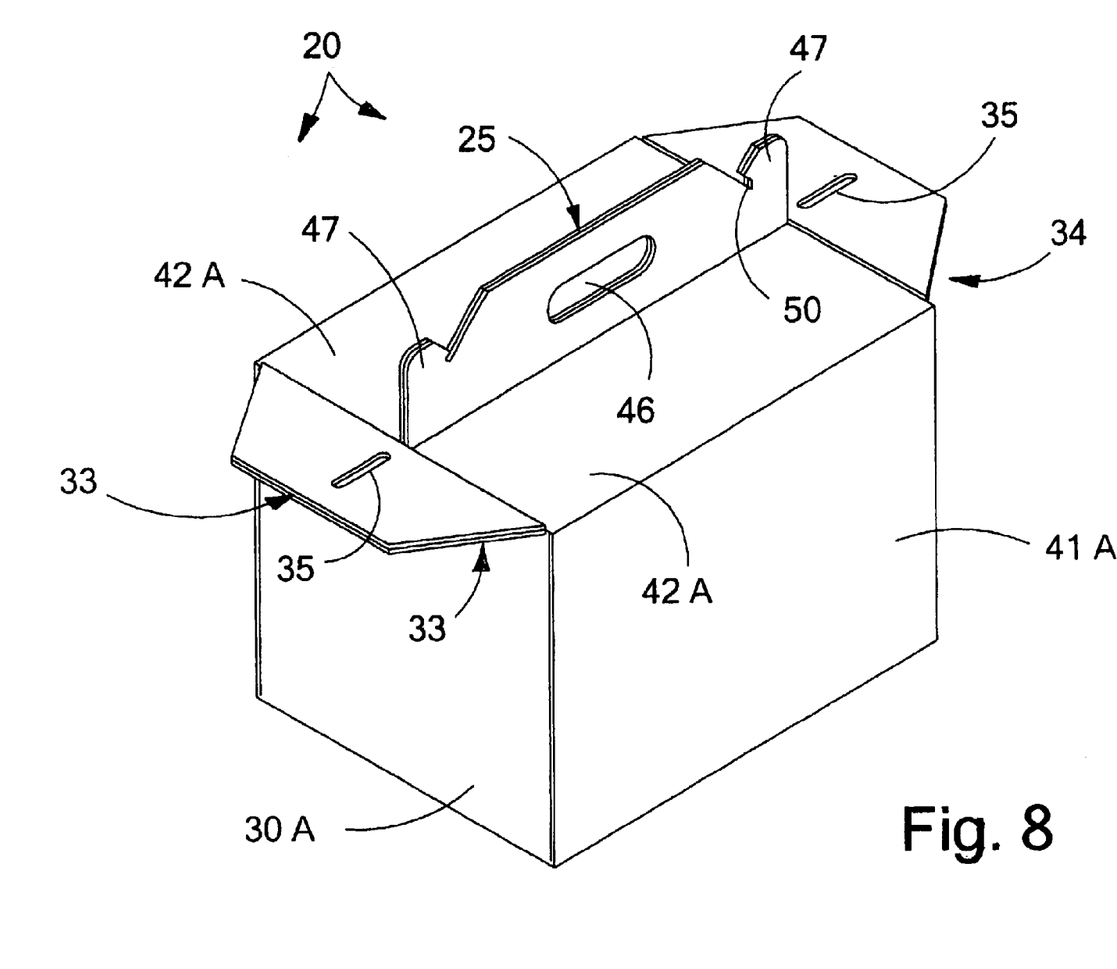

The handle panels 43, 44 are preferably mirror images of one another. Each handle panel is divided into a generally rectangular roof segment 42 and an integral handle segment 45, that includes an elongated carrying hole 46 through which one's fingers may extend when grasping the handle 25 (FIG. 8). After folding, the deployed roof segments 42 lie in a common plane at the top of the cooler and form its flat top. The handle segments 45 flatly abut one another and occupy a vertical plane, with handle segments 45 and carrying holes 46 aligned.

Figure 9:
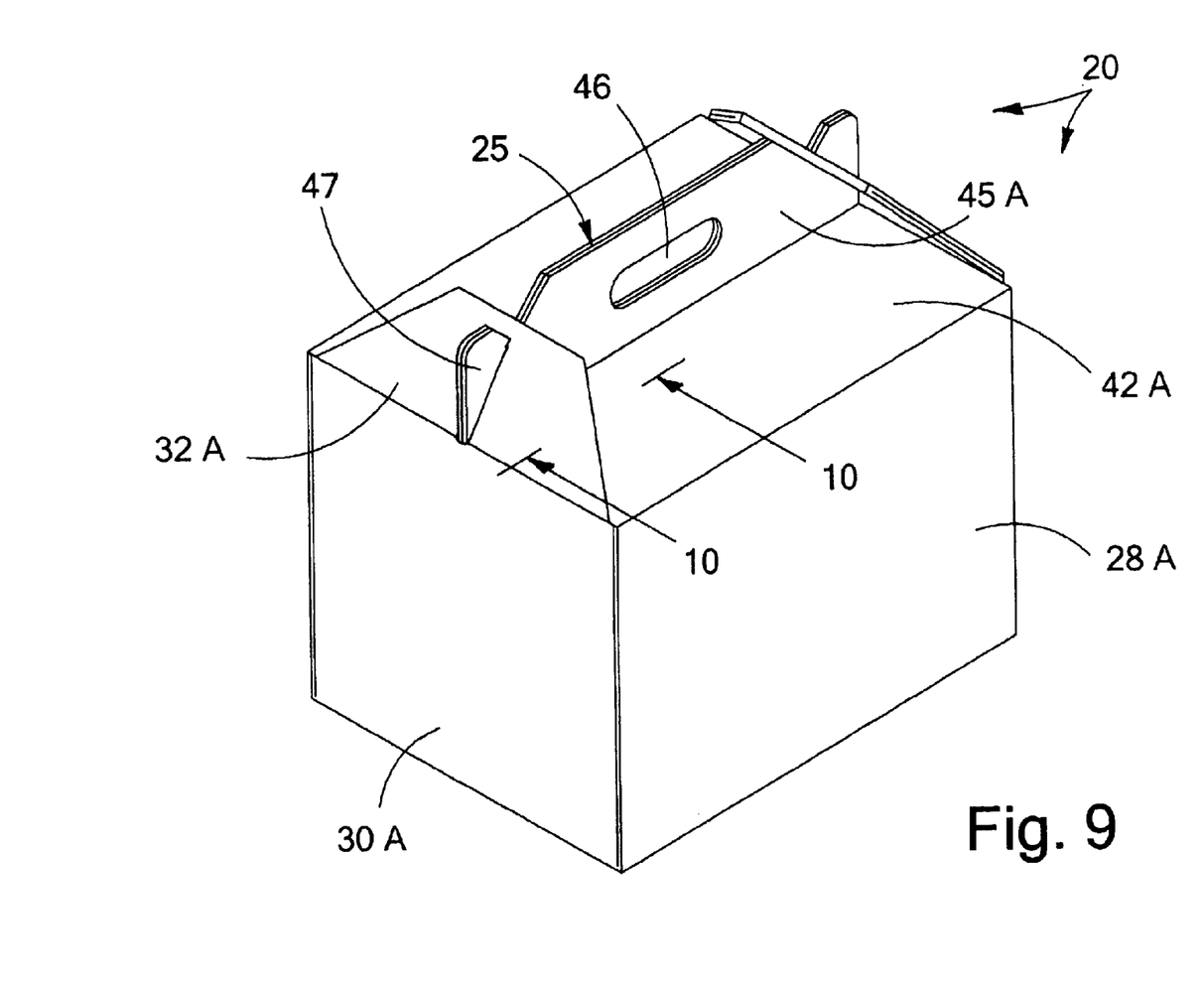
Figure 10:
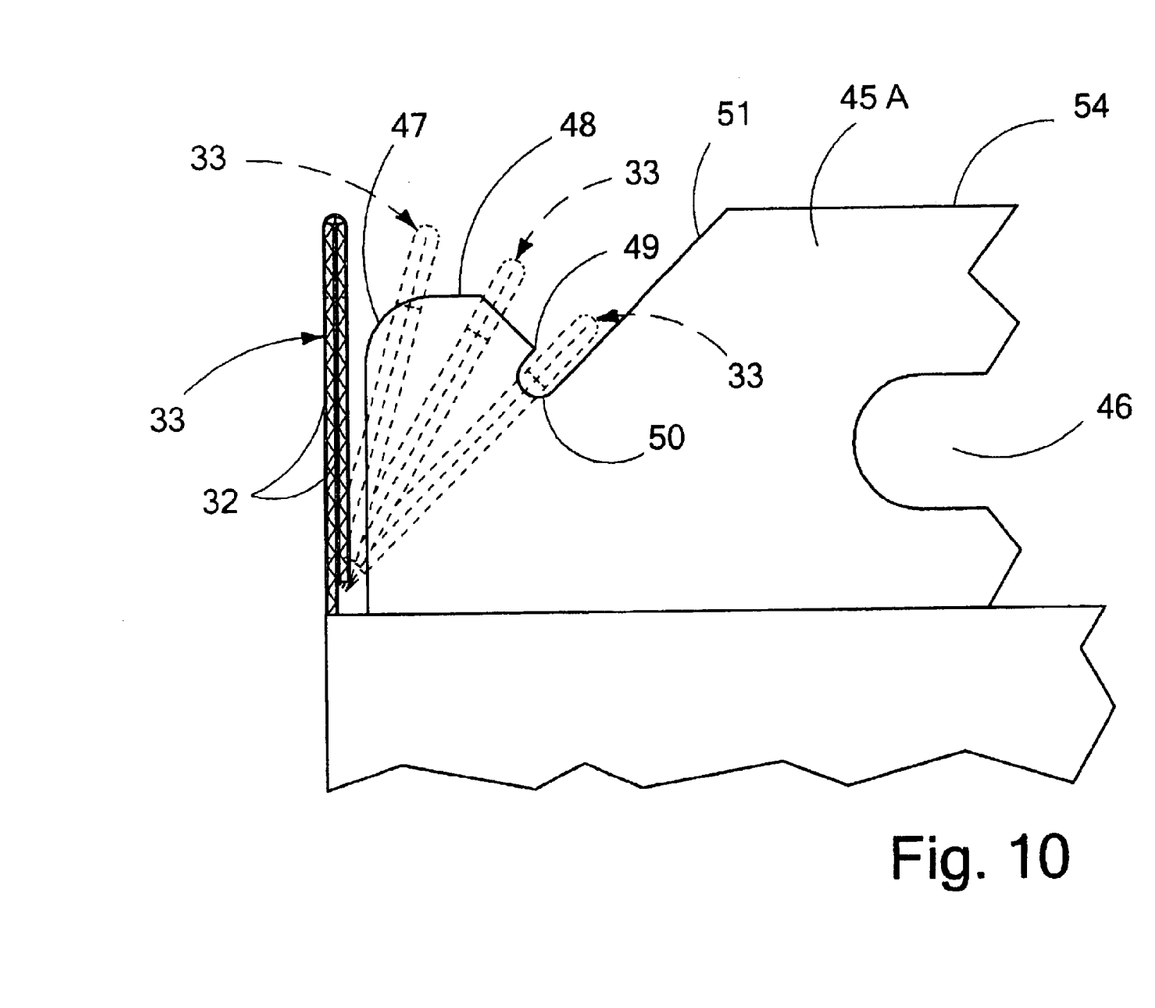
FIG. 10 is an enlarged, fragmentary plan view derived from a point of view looking along line 10—10 in FIG. 9; and, FIGS. 11 and 12 are perspective views showing various sequential stages as the erected box is collapsed into a flat, easily stored and transported configuration.

Importantly, the handle segment 45 is specially configured. With primary reference directed to FIG. 10, in which undersurface 45A of the lower handle segment 45 in FIG. 1 faces the viewer, the illustrated corner section is greatly enlarged. The corner sections of each handle segment are mirror images, so only one corner need be discussed in detail. Each corner forms a radiused locking tab 47 that in assembly penetrates the aligned receptive slots 35 (FIG. 1) in the locking panels. The outer radius 48 (FIG. 10) of each tab curves inwardly towards an enlarged radius portion 49, that adjoins a captivation notch 50, that seats and captivates the locking panels by hooking the locking slots 35 (FIG. 1). In other words, a piece of the central portion 52 (FIG. 1) of a folded-together locking panel, that forms the top of the aligned, composite locking slot 35, is locked within captivation notch 50 and prevented from withdrawal by enlarged tab radius portion 49 (FIG. 10). The locking notch is aligned with the inclined edge 51 of the upper handle segment 45/45A (FIG. 10), and it projects towards the top 54 thereof. Thus the locking panel receptive slots 35 are penetrated and engaged by the locking tabs 47 (FIG. 9). Frictional force increases as the latter parts are pressed together, as contact is first made along radius 48 (FIG. 10), and force peaks when enlarged radius portion 49 is engaged. Immediately afterwards, the tension releases somewhat, as portion 49 is passed, and the upper edge of the composite receptive slot 35 becomes nested and locked within captivation notch 50 (FIG. 10). This "overcenter action" allows the handle to in effect be locked into the desired configuration. At the same time, the roof segments 42/42A will be disposed horizontally, as in FIG. 7.

The locking panels are transformed from their hourglass configuration to a two-ply trapezoidal configuration when halves 32 are first folded about line 29 (FIG. 1). In assembly, the locking panels 33, 34 form a lock when they are press-fitted against the handle segments 45 on the opposite ends (i.e., FIG. 9). It is preferred that the locking panels are inclined relative to the horizontal, i.e., they are angled relative to the roof panels. Preferably, the locking panels couple to the handle segments at an acute angle of approximately forty to fifty degrees, with forty-five degrees preferred. Vertical forces experienced by the handle 25 (i.e., FIG. 9) will pull on the folded locking panels 33, 34, and their angular orientation will direct forces both horizontally and vertically. In other words, handle-applied forces transmitted to the cooler 20 will be dispersed and divided through vector resolution into both horizontal and vertical components. In effect, the vector resolution of these potentially damaging forces not only pre-stress and pre-tension the cooler 20 to strengthen it, but ensures that the locking system does not fail.

Numerous fold lines proximately defined between the above discussed, orthogonally arranged panels are scored into the blank 24. These score lines facilitate subsequent folding of adjacent panels or segments. A pair of elongated, spaced apart fold lines 70, 71 (FIG. 1) extend the length of the blank 24 and separate the side panels 40, 41 and the corner panels 36–39 from the central panel 28 and end panels 30 and 31 (FIG. 1). A similar pair of elongated, spaced apart fold lines 75, 76 perpendicularly running the width of blank 24 separate the end panels 30, 31 and the corner panels 36–39 from the central panel 28 and side panels 40, and 41. An interior, elongated, double-scored fold line 80 is aligned with the longitudinal axis 23 and receptive slots 35; it traverses the entire blank 24 and divides it in half.

Each corner panel 36–39 is similarly sized and configured. Each is somewhat square, with an outer notch 59

Figure 11:
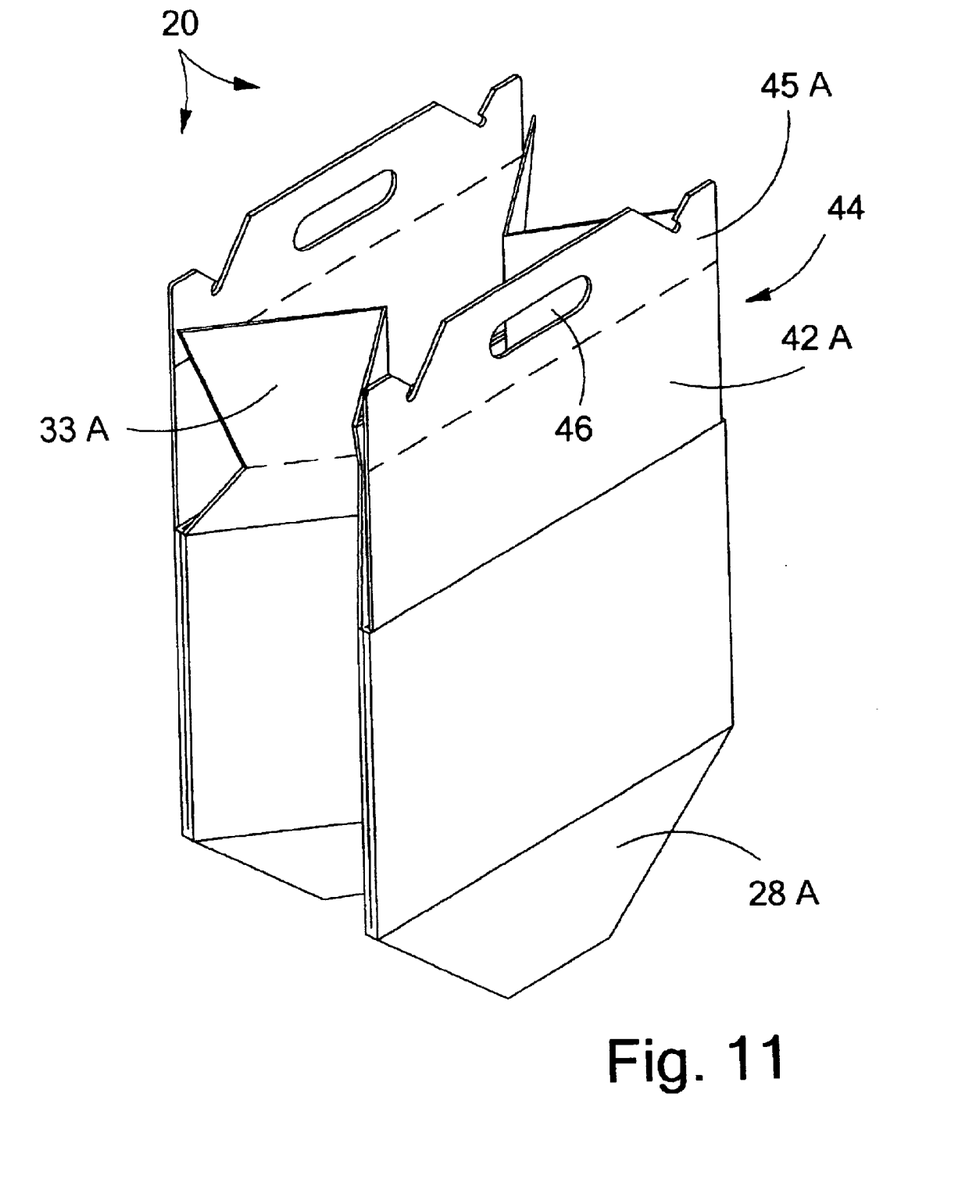
Figure 12:
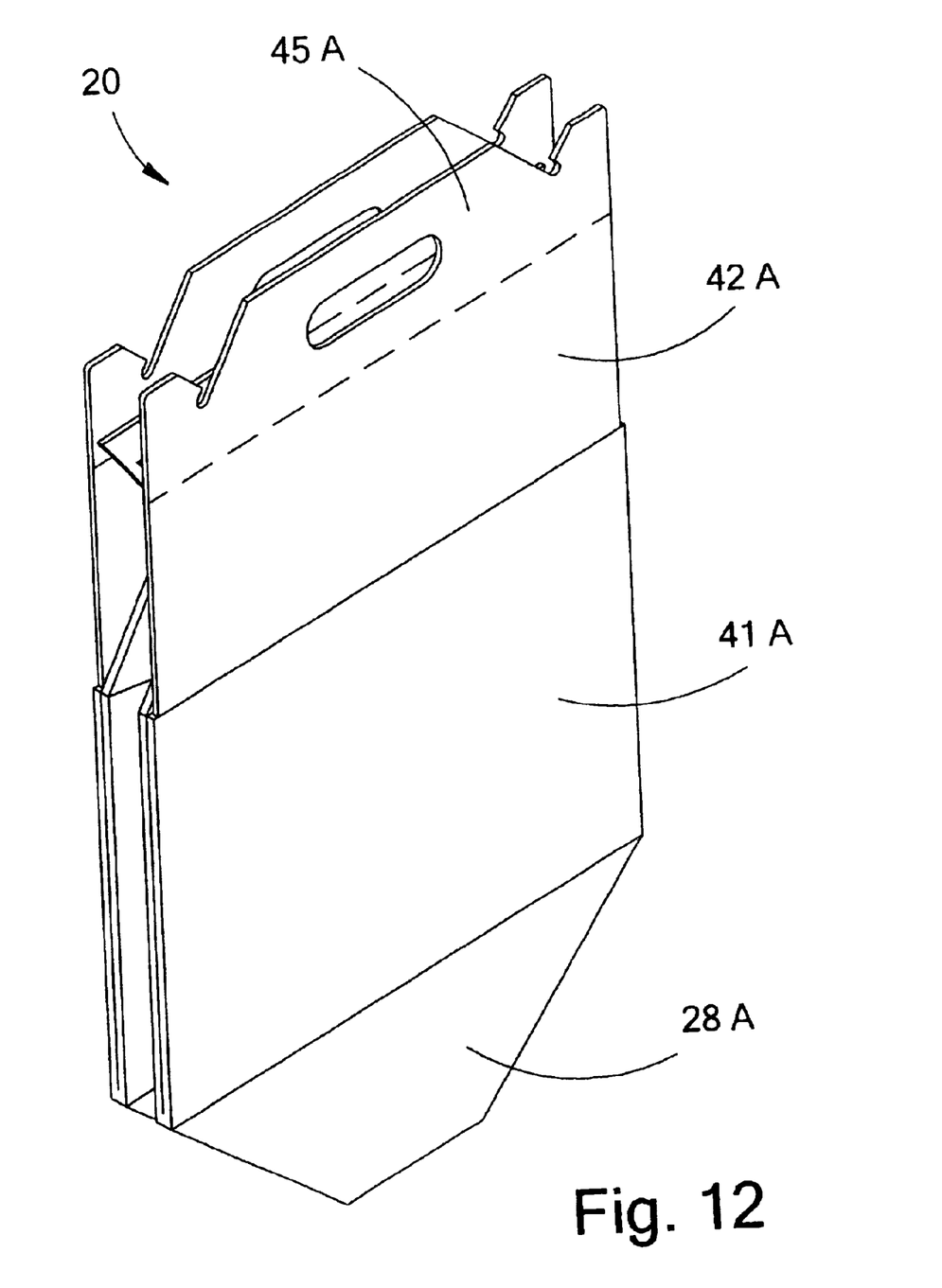

(FIGS. 1, 2) cut into diametrically, outwardly extending vertice. Each corner panel 36–39 has a diagonal score line 92 defined through its center, running from a vertice of central panel 28 to the notch 59 that enables leak-proof folding. Central panel 28 is preferably provided with an array of knock-down score lines, generally designated by the reference numeral 99. The generally V-shaped arrays 99 each comprise multiple, independent and angled score lines that enable the partially completed cooler 20 to be "knocked down" or non-destructively and temporarily "squashed" for transport or temporary storage, as depicted in FIGS. 11 and 12. The latter phenomena is explained in detail in prior U.S. Pat. No. 5,062,527, entitled "Foldable, leakproof multimode Carton Construction," which issued Nov. 5, 1991, and which is owned by the same assignee as in this case. The latter patent, including its text and drawings, are hereby incorporated by reference for purposes of disclosure.

Preferred Assembly

Those with skill in the art will immediately recognize that various assembly steps may be juxtapositioned during box erection. Although the order of folding may be varied, the preferred steps are sequentially illustrated by FIGS. 2–9.

Figure 2:
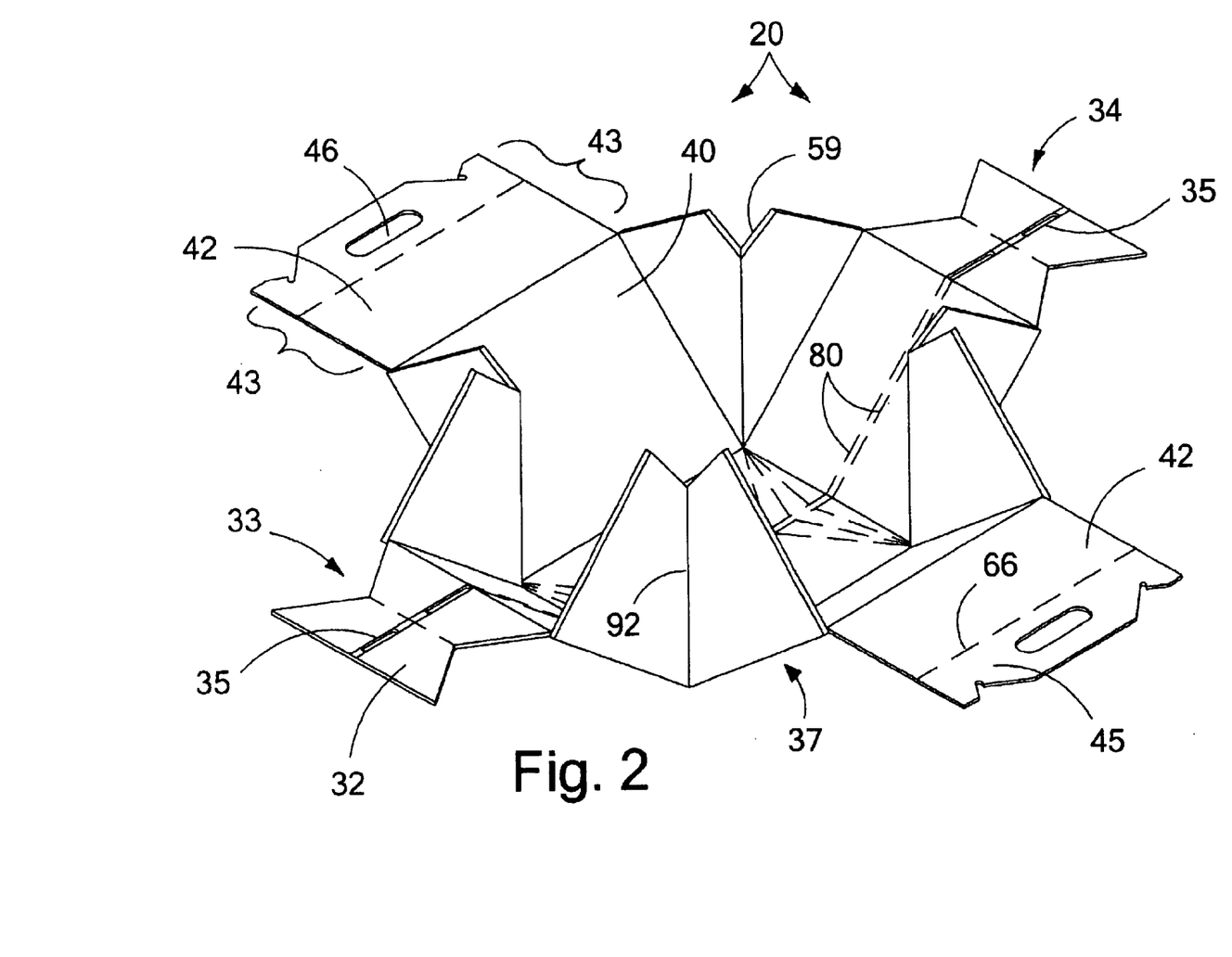
FIGS. 2–9 are perspective views showing various sequential stages as the blank is folded to form the cooler.
Figure 3:
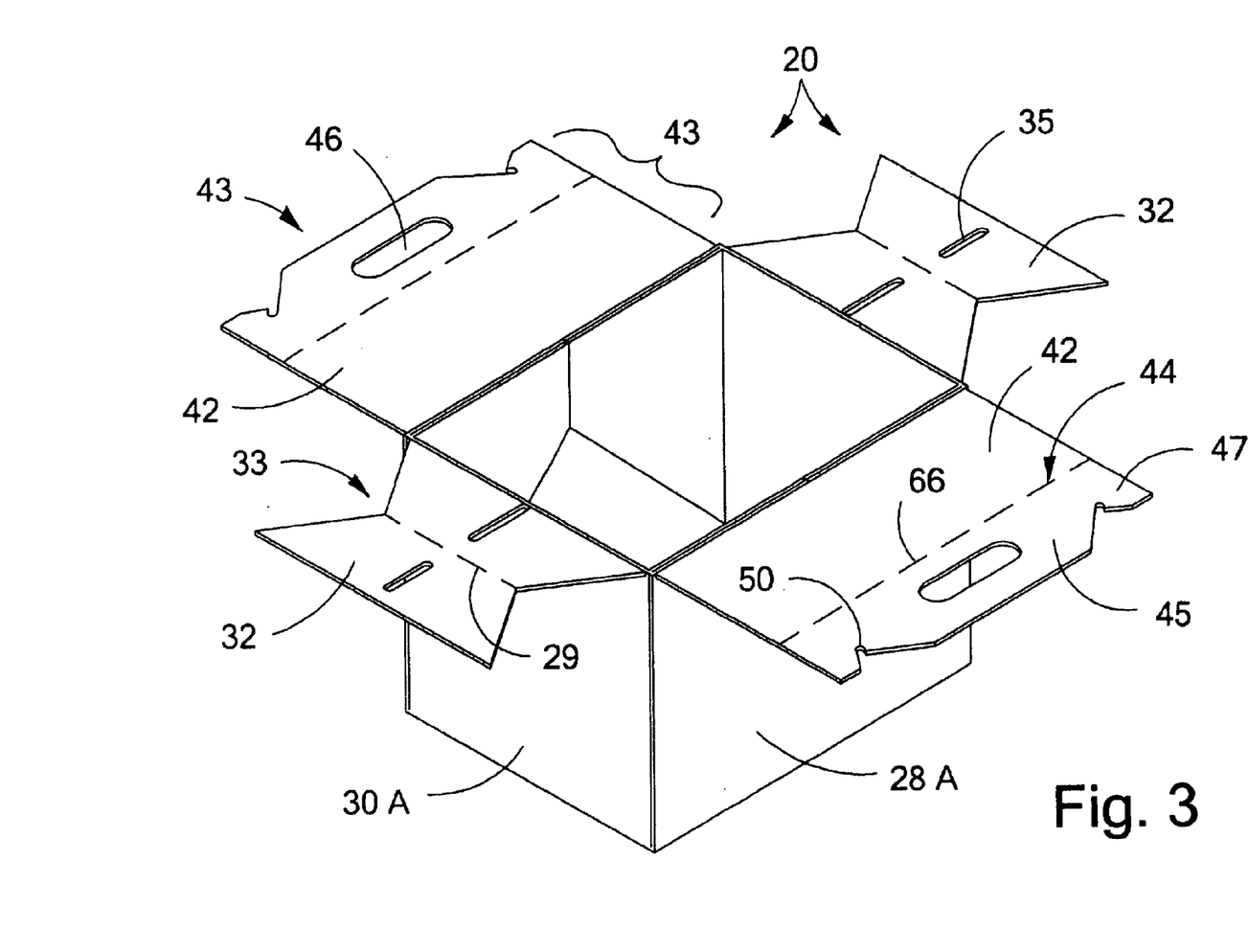
Figure 4:
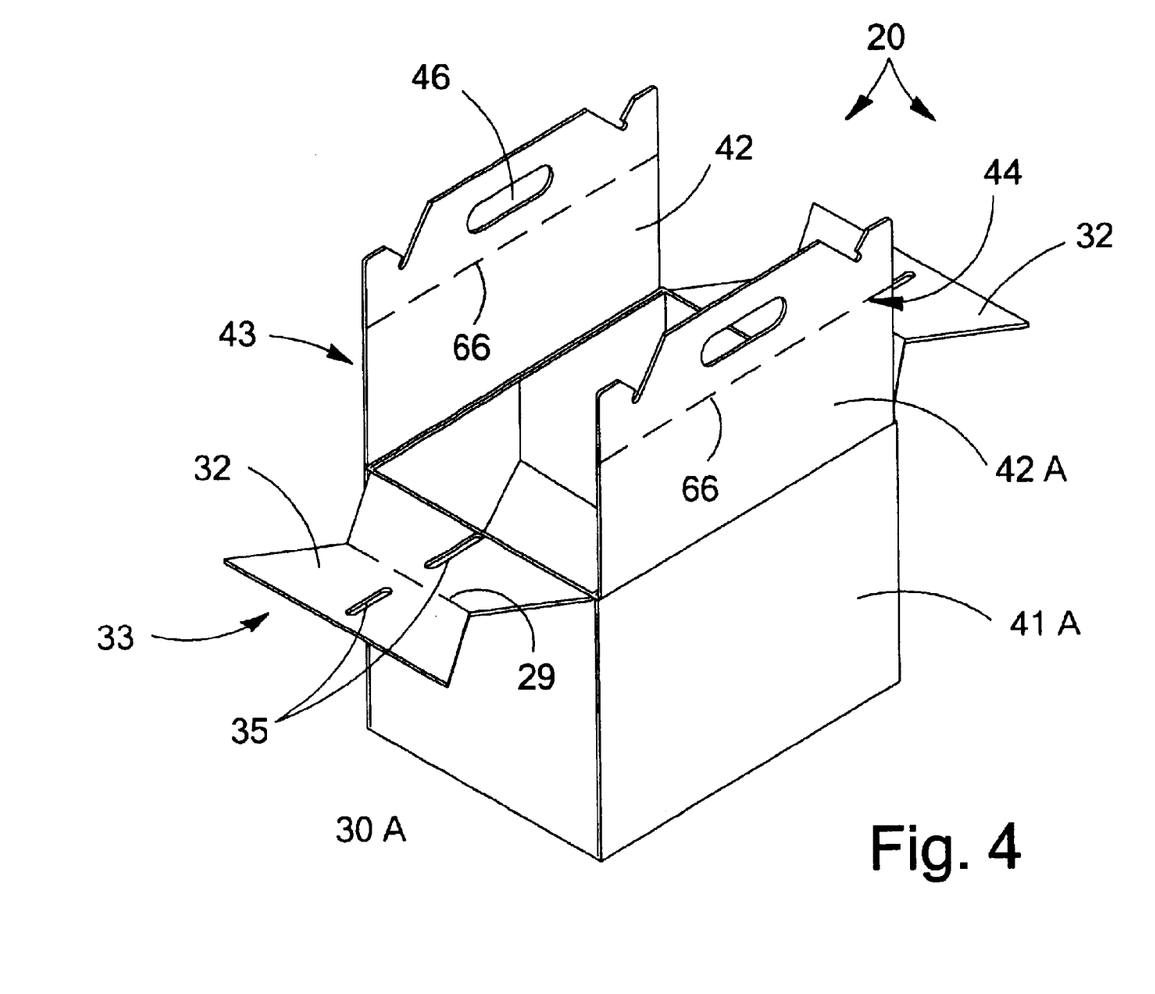
Figure 5:
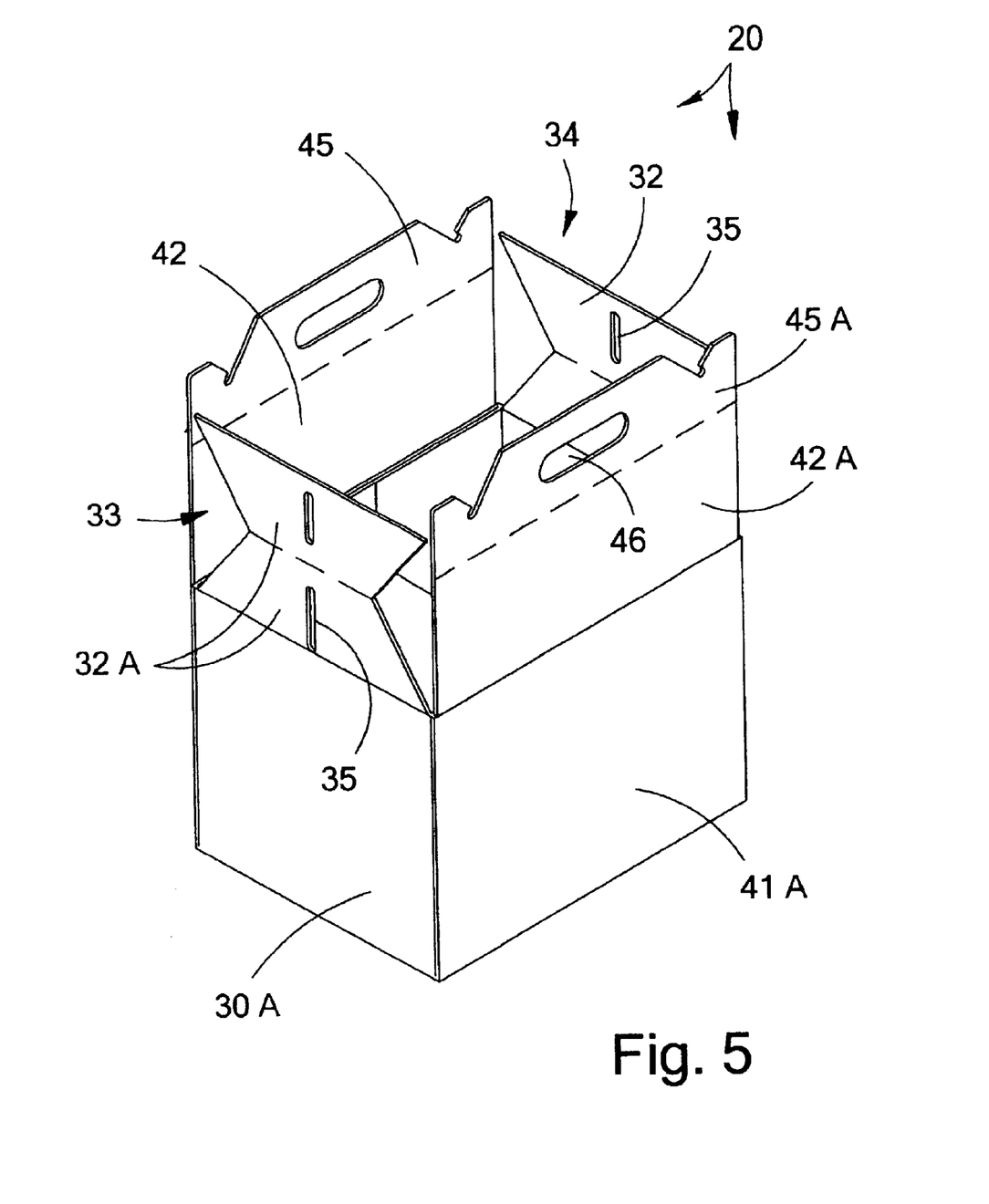
Figure 6:
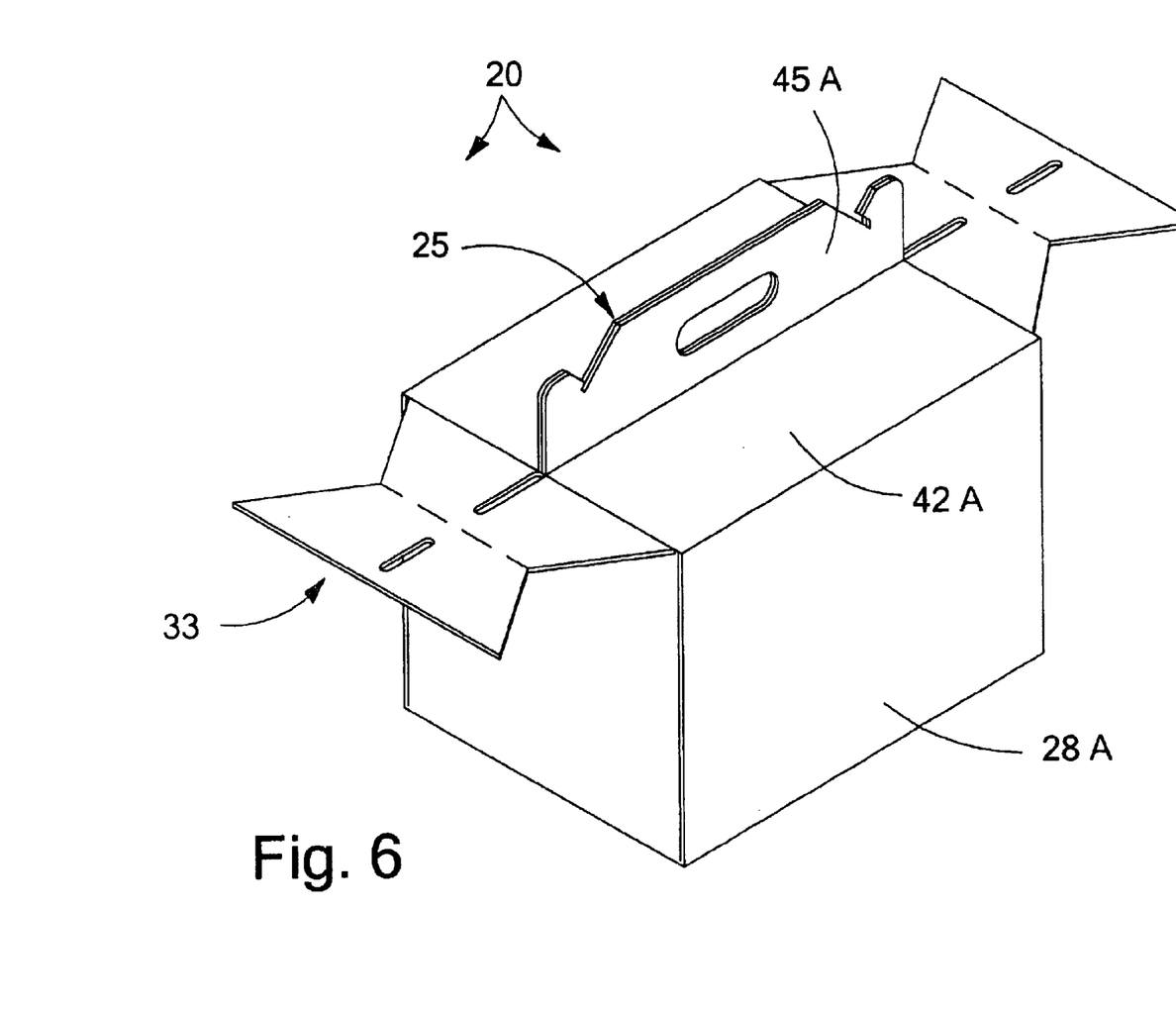

Folding commences as in FIG. 2, with the corner panels 36–39 pushed together to fold upon themselves about fold lines 59, and to thereafter nest within the "box" formed by the other panels. In FIG. 3, the blank 24 has been formed into a box-like enclosure as the side and end panels have been arranged vertically around the central panel, with the corner panels nested inwardly. The handle panels 43, 44 are then moved vertically upwardly into the position of FIGS. 4 and 5. The locking panels 33, 34 can also be urged through an intermediate vertical position during assembly, as depicted in FIG. 5. Then handle segments 45 and roof segments 42 are folded over score line 66 (i.e., FIGS. 2, 4), so that roof segments 42/42A are horizontally laid flat on top of the cooler, and the handle segments 45,45A are disposed vertically in side by side relationship (FIGS. 6, 7).

Figure 7:
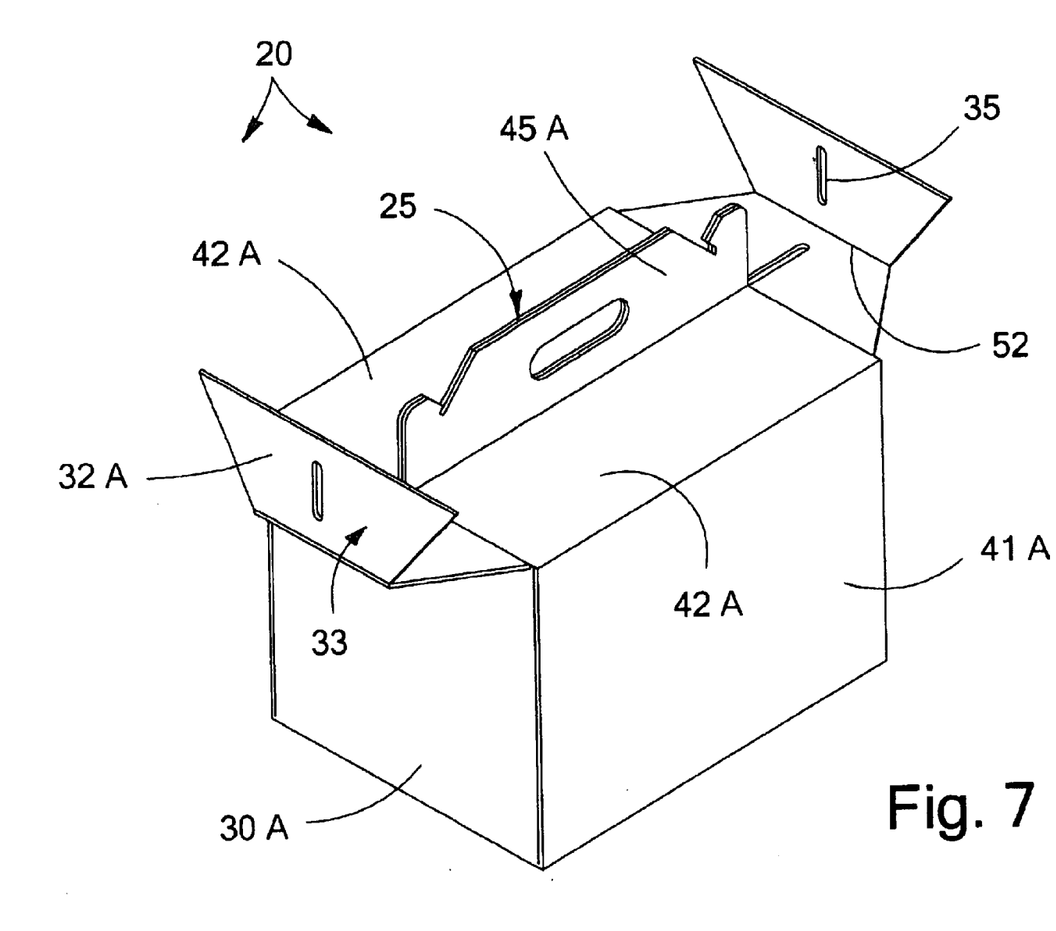

At this point the critical locking panel halves 32 may be folded over score line 29 towards the orientation seen in FIG. 7. When halves 32 of each locking panel 33, 34 are folded flatly together as seen in FIG. 8, the locking panels may be pressed into engagement with the locking tabs 47 (FIGS. 9, 10) and snapped into locking engagement wherein locking tabs 47 (FIG. 10) are captivated within the locking slots 35, registered within and locked within, and by captivation notch 50 (FIG. 10).

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A sheet-like blank to be folded into a container for storing and transporting ice and food or beverages, said blank comprising:
   a generally rectangular center panel having ends and sides;
   a pair of integral, foldable, end panels adjacent ends of said center panel;
   a pair of integral, foldable, side panel adjacent sides of said center panel;
   an integral handle panel formed on each side panel, each handle panel comprising a generally rectangular roof segment and an adjoining handle segment, the handle segments comprising corners with locking tabs, and hand grip holes enabling carrying; and,
   an integral locking panel formed on each end panel for engaging the handle panels when the blank is folded, each locking panel comprising a pair of mirror image halves adapted to be folded together, and each half comprising a receptive slot adapted to be penetrated by said tabs when the blank is foldably transformed into said container.

2. The blank as defined in claim 1 wherein after folding, each roof segment is disposed horizontally and each handle segment is disposed vertically.

3. The blank defined in claim 2 wherein the locking panels are coupled to the handle segments in assembly, and are inclined relative to the roof segments.

4. The blank as defined in claim 1 wherein the handle segments comprise a captivation notch adjacent each locking tab for locking and captivating the locking panels.

5. The blank as defined in claim 4 wherein the locking tabs on the handle panels are radiused and comprise an enlarged radius portion that establishes an overcenter action.

6. The blank as defined in claim 5 further comprising
   a first pair of spaced apart, generally parallel score lines on said blank separating said center panel from said end panels and said corner panels and enabling folding;
   a second pair of spaced apart, generally parallel score lines generally perpendicular to and intersecting said first pair of score lines, said second pair of score lines separating said center panel from said side panels and corner panels; and,
   wherein said center panel comprises a knock-down score line array for facilitating the quick collapse of said cooler into a flattened configuration for convenient transport and storage.

7. A sheet-like blank to be folded into a container for storing and transporting ice and food or beverages, said blank comprising:
   a generally rectangular center panel having ends and sides;
   a pair of integral, foldable end panels adjacent ends of said center panel;
   a pair of integral, foldable side panels adjacent sides of said center panel;
   an integral handle panel formed on each side panel, and each handle panel comprising a generally rectangular roof segment and an adjoining handle segment with a fold line therebetween, each handle segment comprising corners with locking tabs and hand grip holes enabling carrying; and,
   an integral locking panel formed on each end panel for engaging the handle panels when the blank is folded, each locking panel when unfolded comprising an hourglass shape, each locking panel comprising a pair of trapezoidal halves adapted to be folded together, and each half comprising an elongated, receptive slot that is penetrated by said tabs when the container is folded.

8. The blank as defined in claim 7 wherein, after folding, each roof segment is disposed horizontally and each handle segment is disposed vertically, and the locking panels are coupled to the handle segments and inclined relative to the roof segments.

9. The blank as defined in claim 8 wherein the handle segments comprise a captivation notch adjacent each locking tab for captivating the locking panels.

10. The blank as defined in claim 8 wherein the locking tabs on the handle panels are radiused and comprise an enlarged radius portion that establishes an overcenter action.

11. The blank as defined in claim 10 further comprising
a first pair of spaced apart, generally parallel score lines on said blank separating said center panel from said end panels and said corner panels and enabling folding;
a second pair of spaced apart, generally parallel score lines generally perpendicular to and intersecting said first pair of score lines, said second pair of score lines separating said center panel from said side panels and corner panels; and,
wherein said center panel comprises a knock-down score line array for facilitating the quick collapse of said cooler into a flattened configuration for convenient transport and storage.

12. A container for storing and transporting ice and food or beverages, said container foldably erected from a sheet-like blank and comprising:
a generally rectangular bottom formed from a center panel of the blank, the center panel having ends and sides;
a pair of parallel, spaced apart ends formed from blank end panels located adjacent ends of said blank center panel;
a pair of parallel, spaced apart sides formed from blank side panels located adjacent sides of said blank center panel;
an integral handle formed from abutting handle panels on each side panel of said blank, each handle panel comprising a generally rectangular roof segment and an adjoining handle segment, the roof segments forming the container top and the handle segments comprising corners with locking tabs and hand grip holes enabling carrying; and,
integral locks formed from locking panels formed on each blank end panel for engaging the handle when the blank is folded, each locking panel comprising a pair of mirror image halves adapted to be folded together, and each half comprising a receptive slot adapted to be penetrated by said locking tabs when the container is foldably erected from said blank.

13. The container as defined in claim 12 wherein after folding, each roof segment is disposed horizontally and each handle segment is disposed vertically.

14. The container defined in claim 13 wherein the locking panels are coupled to the handle segments in assembly, and are inclined relative to the roof segments.

15. The container as defined in claim 12 wherein the handle segments comprise a captivation notch adjacent each locking tab for locking and captivating the locking panels.

16. The container as defined in claim 15 wherein the locking tabs on the handle panels are radiused and comprise an enlarged radius portion that establishes an overcenter action.

17. A container for storing and transporting ice and food or beverages, said container foldably erected from a sheet-like blank and comprising:
a generally rectangular bottom formed from a center panel of the blank, the center panel having ends and sides;
a pair of parallel, spaced apart ends formed from blank end panels located adjacent ends of said blank center panel;
a pair of parallel, spaced apart sides formed from blank side panels located adjacent sides of said blank center panel;
an integral handle formed from abutting handle panels formed on each side panel of said blank, each handle panel comprising a generally rectangular roof segment and an adjoining handle segment with a fold line therebetween, the roof segments forming the container top and the handle segments comprising corners with locking tabs and hand grip holes enabling carrying; and,
integral locks formed from locking panels formed on each blank end panel for engaging the handle when the blank is folded, each locking panel comprising a pair of trapezoid-shaped halves adapted to be folded together, and each half comprising an elongated tab-receptive slot adapted to be penetrated by said locking tabs when the container is foldably erected from said blank.

18. The container as defined in claim 17 wherein each roof segment is disposed horizontally and each handle segment is disposed vertically, and the locking panels are coupled to the handle segments and inclined relative to the roof segments at an acute angle between forty and fifty degrees.

19. The container as defined in claim 18 wherein the handle segments comprise a captivation notch adjacent each locking tab for captivating the locking panels.

20. The container as defined in claim 19 wherein the locking tabs on the handle panels are radiused and comprise an enlarged radius portion that establishes an overcenter action.

* * * * *